United States Patent Office 3,573,960
Patented Apr. 6, 1971

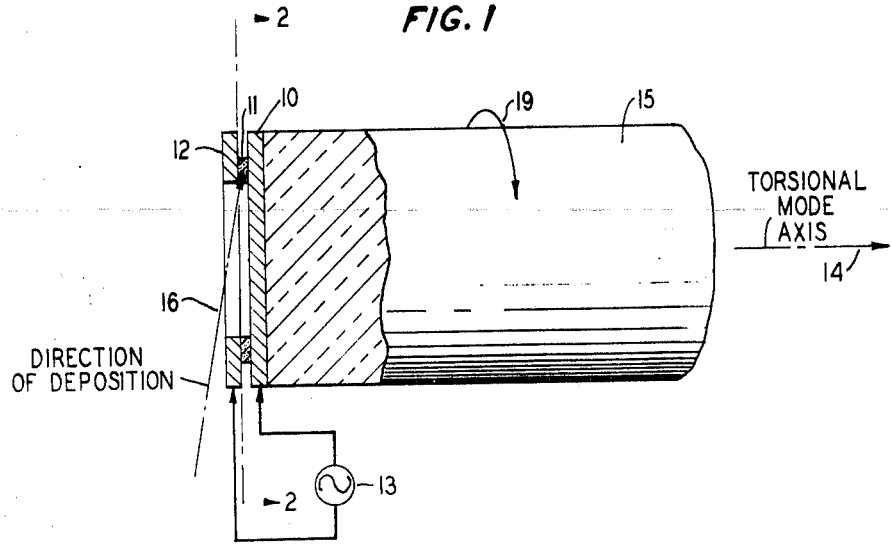
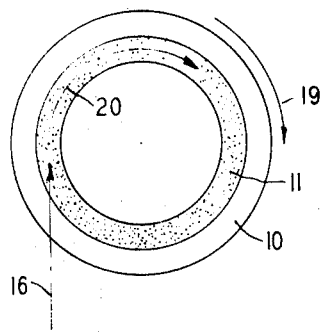
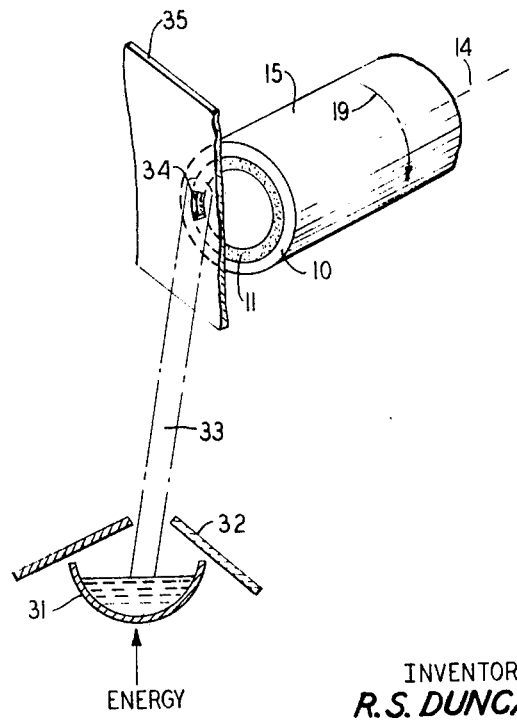

3,573,960
TORSIONAL MODE ELASTIC WAVE TRANSDUCERS
Robert S. Duncan, Winston-Salem, N.C., assignor to Bell Telephone Laboratories, Incorporated, Murray Hill and Berkeley Heights, N.J.
Filed Dec. 19, 1968, Ser. No. 785,268
Int. Cl. B05c 1/16, 3/20
U.S. Cl. 117—38                                     4 Claims

ABSTRACT OF THE DISCLOSURE

A method of forming torsional mode elastic wave transducers by evaporating or otherwise depositing piezoelectric material on an end surface of a delay line at an angle to this surface while the line is rotating. The material forms a ring with the piezoelectric polarization and direction of shear motion circumferential to said ring.

BACKGROUND OF THE INVENTION

This invention relates to elastic wave transducers and more particularly to torsional mode transducers operating into the very high frequency range and to a method for fabricating the same.

The properties and applications of torsional mode transducers and elastic wave delay lines utilizing this mode are well known. In general, the delay medium takes the form of an elongated rod or wire of generally circular cross section and the torsional mode is defined as that mode in which the direction of particle vibration is circumferential about the axis of the medium and the direction of propagation therealong. One unique property of the torsional mode which has contributed to its usefulness is the fact that this mode is nondispersive, i.e., the propagation velocity along the medium is independent of frequency. Thus square wave pulses can be delayed or stored for digital applications. Transducers heretofore generally available have been either magnetostrictive or have been made from assembled segments of polarized piezoelectric materials and have been limited in operation to frequencies well below 1 MHz. While thin film piezoelectric transducers have enabled operation above this frequency in other modes, thin film techniques have not been applied to torsional mode devices. In particular, transducers operating in the shear mode, i.e., particle vibration perpendicular to the propagation axis, have been formed by evaporating, sputtering or otherwise depositing submicroscopic piezoelectric particles upon a substrate at an acute angle to the substrate so that a layer is formed with a substantial component of the piezoelectric axis of the layer material lying in the plane of the layer.

SUMMARY OF THE INVENTION

In accordance with the present invention the foregoing deposition techniques are adapted to the formation of torsional mode elastic wave transducers by evaporating or otherwise depositing piezoelectric material on a portion of the end surface of the delay line at an acute angle to this surface while the line is rotating around the intended axis of propagation. The material forms a flat ring with the piezoelectric polarization and the direction of shear motion circumferential about the axis. When a voltage is applied between electrodes on either surface of the ring, an electric field is developed parallel to the axis of propagation as required to develop a torsional mode in the line. Since the deposited ring can be very thin, resonance thereof in a broadband range above 1 mHz. is easily obtained.

BRIEF DESCRIPTION OF THE DRAWING

FIG. 1 is a view, partially in cross section, of a torsional mode transducer utilizing a deposited, ring shaped layer of high resistivity piezoelectric material in accordance with the invention;
FIG. 2 is a cross-sectional view of a portion of FIG. 1 showing the piezoelectric layer and the direction of piezoelectric polarization therein; and
FIG. 3 is a schematic illustration of the apparatus used to practice the method of the invention.

More particularly, FIG. 1 represents the end of a typical delay line 15 within which it is desired to launch torsional mode ultrasonic vibrations traveling in a direction parallel to axis 14. Line 15 may be of quartz, glass or a metal such as aluminum and usually has a circular cross-sectional shape. A first conductive layer or film 10 is suitably plated, deposited or otherwise applied by known techniques to an end face of line 15 that is substantially normal to axis 14. Layer 10 may be a material selected from the group including gold, silver and copper. Layer 11 represents the ring of piezoelectric material formed using layer 10 as a substrate according to the deposition process described hereinafter. The material forming layer 11 (hereinafter referred to as ring 11) has been derived from a material source located away from and at an acute angle to the surface of substrate 10 as represented by the arrow 16, while substrate 10 and line 15 are rotated as represented by arrow 19. By limiting the area of deposition and at the same time rotating the position of this area during deposition, crystals build up from the deposit in the form of a ring, as may be seen in FIG. 2, on substrate 10 in which the piezoelectric axes of the majority of the crystals lie circumferentially in the plane of the ring as represented by arrow 20. Layer 12, seen in FIG. 1, represents a second conductive layer applied over ring 11 and comprises a further electrode of the transducer by means of which an electric field can be set up in ring 11 in response to alternating-current signals from source 13 applied between layers 10 and 12.

In accordance with the invention, ring 11 is formed by the particular technique now to be described with reference to FIG. 3. This technique will be referred to as "evaporation" as described in detail in U.S. Pat. 3,388,002 granted June 11, 1968 to N. F. Foster, but it should be understood that equivalent processes may be used in which energy such as heat is applied to a source of evaporant to cause portions of the source material to be driven away from the source submiscrospic particles. Suitable apparatus is commercially available and includes forms in which true evaporation takes place as well as those in which the process is more accurately referred to as "sputtering."

In either case hexagonal cadmium sulfide and zinc oxide are preferred semiconductive, piezoelectric materials, it being understood that similar compounds would be handled in related ways. For example, other materials having piezoelectric, semiconductive properties in Group II–VI and having either a hexagonal or wurtzite structure are cadmium selenide, zinc sulfide and magnesium telluride. In addition, cubic Group II–VI materials such as zinc sulfide (zinc blend), cubic cadmium sulfide and cubic zinc oxide may be employed.

Powdered material, for example, cadmium sulfide, is first placed in boat 31 of the evaporator and heated to a dull red heat for a few minutes in a vacuum. This step allows foreign material in the form of gases to be driven from the cadmium sulfide. Line 15, upon which layer 10 has already been formed, is placed in the evaporator with layer 10 a few inches from boat 31 and located so that layer 10, which constitutes the substrate upon which the evaporated film is desposited, is at an acute angle to the direction from the boat. The evaporator is evacuated or filled with an appropriate atmosphere. The substrate is then heated to a temperature sufficient to drive off foreign material and other contamination. The cadmium sulfide is then heated to a temperature which causes it to evaporate. The substrate (layer 10) is simultaneously brought to a temperature high enough that the deposited material forms upon it in a craystalline state but below the evaporation temperature of the material to be deposited to prevent undue re-evaporation. Temperatures too low cause the deposited material to form in an amorphous and disordered state. In general, it has been found that the evaporant and substrate temperatures should have such a relationship to each other that the deposited layer builds up at a rate of less than one micron per minute. Rates much greater than this tend to produce less perfect crystal structures. The total length of time of course depends upon the thickness desired for ring 11 which in turn depends upon the intended operating frequency.

Baffles 32 are part of the evaporation apparatus and cause the material to leave boat 31 in a relatively defined beam 33 directed toward aperture 34 in mash 35. It is preferred that aperture 34 be displaced away from axis 14 and have a truncated sector shaped cross section so that relatively more material is directed to the outer and longer arc sections of ring 11 than to the inner and shorter ones so that the over-all distribution of material on the surface of ring 11 is uniform.

While there is no intent to limit the scope of the present invention by the theory now to be presented, this theory is believed to be accurate and consistent with observable facts and accepted scientific principles. Thus, is appears that when the vaporized cadmium sulfide is deposited upon the heated substrate, the first material deposited is in the form of randomly oriented crystals of small size. As further material is deposited, those crystals which have their hexagonal axes aligned with the direction in which the new material arrives tend to recrystallize and grow. If this direction is substantially normal to the surface of the substrate, the majority of crystals which grow to moderate size have their axes perpendicular to this surface. If, however, this direction is at an acute angle to the substrate, the crystals tend to grow at small acute angles to the substrate so that a substantial component of their piezoelectric axis lies in the plane of the substrate. The percentage of this component lying in the plane can be increased by first applying to the surface of the substrate a flux which increases the surface mobility of the deposited crystals as disclosed in the copending application of N. F. Foster Ser. No. 785,282, filed on an even date herewith. Since the substrate is rotating the crystals at each point build up with axes that are aligned tangentially to the motion. The combined effect of many crystals is to produce a net piezoelectric polarization circumferentially about the axis of rotation.

Semiconductive, piezoelectric materials of the type described ordinarily have too low a resistivity to support a suitable piezoelectric field. The resistivity of the material of ring 11 must therefore be increased in known ways either during the deposition process or thereafter. For example, the resistivity may be raised by a subsequent heat treatment to diffuse into the material compensating atoms from the substrate and/or oxygen atoms from the surrounding atmosphere which tend to trap, compensate or otherwise neutralize current carriers resulting from excess Group II elements in the deposited material. Alternatively, the resistivity of the layer may be increased by evaporating the compensating atoms along with the semiconductive material or by applying an overlayer of compensating material and diffusing therefrom compensating atoms. Alternatively or in combination with compensation, the resistivity of the layer may be increased by rendering it more nearly stoichiometric. For example, in the specific case of cadmium sulfide where the low resistivity of the evaporated layer appears to result from an excess of cadmium which supplies the current carriers, these may be eliminated by heating the layer in a vacuum to drive off the excess cadmium or in air or sulphur vapor to fill the sulphur voids. In the case of zinc oxide it has been found satisfactory to conduct the original deposition in an oxygen atmosphere from which sufficient oxygen atoms enter the layer to raise the resistivity by filling oxygen voids.

After suitably raising the resistivity of ring 11, the transducer is completed by applying conductive electrode 12 and electrical connections to it and to layer 10. A signal from source 13 will set up an electric field between electrodes 10 and 12 around ring 11. Each incremental sector of ring 11 will respond with a particle displacement tangential to the ring so that together all sectors produce a total displacement circumferential about axis 14 as required to launch a torsional mode in medium 15.

In all cases it is to be understood that the above described arrangements are merely illustrative of a small number of many possible applications of the principles of the invention. Numerous and varied other arrangements in accordance with these principles may readily be devised by those skilled in the art without departing from the spirit and scope of the invention.

What is claimed is:
1. The method of forming an ultrasonic transducer vibrating in the torsional mode from material having piezoelectric properties which comprises applying energy to a source of said material sufficient to cause portions thereof to be driven away from said source in submicroscopic particles, locating a substrate in the path of said portions to form a layer on a restricted area of said substrate in a crystalline state with the piezoelectric axes of a majority of the crystals in said area aligned and polarized in the same direction, tilting said substrate at an acute angle to said path so that said material arrives along said path at said angle to align substantial components of said piezoelectric axes in the plane of said layer, and rotating said substrate about an axis normal to said plane so that said material forms a ring on said substrate.

2. The method according to claim 1 wherein a mask having an aperture therein is located between said material source and said substrate.

3. The method according to claim 2 wherein said aperture is shaped as a short sector of said ring and is displaced from the axis of rotation.

4. The method according to claim 1 wherein a compound from the Group II–VI is used to form said ring on said substrate.

References Cited

UNITED STATES PATENTS 2,938,816    5/1960    Karl-Georg Günther.
3,326,718    6/1967    Dill.

ALFRED L. LEAVITT, Primary Examiner

E. G. WHITBY, Assistant Examiner

U.S. Cl. X.R.

117—107.1, 217, 229, 230; 204—192; 340—10